United States Patent [19]

Tenenbaum et al.

[11] Patent Number: 4,817,175
[45] Date of Patent: Mar. 28, 1989

[54] VIDEO STREAM PROCESSING SYSTEM

[75] Inventors: Jay M. Tenenbaum, Portola Valley; Michael F. Deering, Mountain View, both of Calif.

[73] Assignee: Schlumberger Systems and Services, Inc., Sunnyvale, Calif.

[21] Appl. No.: 48,488

[22] Filed: May 4, 1987

Related U.S. Application Data

[63] Continuation of Ser. No. 902,048, Aug. 26, 1986, abandoned, which is a continuation of Ser. No. 591,217, Mar. 19, 1984, abandoned.

[51] Int. Cl.$^4$ ............................................. G06K 9/36
[52] U.S. Cl. ........................................ 382/41; 382/47; 382/49; 382/50; 382/52
[58] Field of Search ............... 358/21 R, 22, 139, 140, 358/903; 382/41, 47, 49, 50, 52

[56] References Cited

U.S. PATENT DOCUMENTS

| | | | |
|---|---|---|---|
| 3,829,831 | 8/1974 | Yamamoto et al. | 340/146.3 |
| 3,849,762 | 11/1974 | Fujimoto | 340/146.3 |
| 4,040,009 | 8/1977 | Kadota | 340/146.3 |
| 4,110,737 | 8/1978 | Fahey | 340/146.3 |
| 4,119,946 | 10/1978 | Taylor | 340/146.3 |
| 4,200,861 | 4/1980 | Huback | 340/146.3 |
| 4,335,398 | 6/1982 | Yamada | 358/80 |
| 4,363,104 | 12/1982 | Nussmeier | 382/41 |
| 4,389,672 | 1/1983 | Bowen et al. | 358/240 |
| 4,464,788 | 8/1984 | Stenberg et al. | 382/41 |
| 4,484,346 | 11/1984 | Stenberg et al. | 382/41 |
| 4,513,390 | 4/1985 | Walter et al. | 364/900 |
| 4,541,114 | 9/1985 | Rutenbar et al. | 382/41 |
| 4,541,115 | 9/1985 | Werth | 382/37 |
| 4,560,974 | 12/1985 | Coleman et al. | 364/900 |
| 4,665,556 | 5/1987 | Fukushima et al. | 382/41 |

FOREIGN PATENT DOCUMENTS

2137847 10/1984 United Kingdom .

OTHER PUBLICATIONS

Siegel et al., "PASM: A Partitionable SIMD/MIMD System For Image Processing and Pattern Recognition", *IEEE Transactions on Computer*, vol. C-30, No. 12, 12/81.
*IEEE Transactions on Communications*, vol. COM-29, No. 12, Dec. 1981, pp. 1898-1925; IEEE,N.Y., U.S., J. C. Stoffel et al.: "A Survey of Electronic Techniques for Pictorial Image Reproduction".
William Newman and Robert Sproull, "Raster Graphics Fundamentals" from Principles of Interactive Computer Graphics, 23rd Edition, 1979.
Alan H. Bond and Hilary Buxton, "Use of Programmable Parallel Hardware for Industrial Vision", SPIE vol. 336 Robot Vision, 1982.
F. A. Williams, "An Expandable Single-IC Digital Filter/Correlator" TRW LSI Products, 1982.
Gerald J. Agin, "An Experimental Vision System for Industrial Application"; Stanford Research Institute, Jun. 1975.
E. J. Delp, T. N. Mudge, L. J. Siegel, H. J. Siegel, "Parallel Processing for Computer Vision"; SPIE vol. 336 Robot Vision 1982.

(List continued on next page.)

*Primary Examiner*—Leo H. Boudreau
*Assistant Examiner*—Jose L. Couso
*Attorney, Agent, or Firm*—Theodore S. Park; Robert C. Colwell; Paul C. Haughey

[57] ABSTRACT

A video stream processing system comprising a novel modular family of image processing and pattern recognition submodules, the submodules utilize a unique system signalling and interface protocol, and thus can be cascaded and paralleled to produce complex special purpose image processing systems which can operate at video or near video data rates. A stream of digitized pixel data is pipelined through a variety of submodules to support a wide variety of image processing applications. A common video interface provides for handling pixel data in the video signal path and a processor interface allows communication to any modern microprocessor for overall system control, for optional addition image processing and for defining options within each submodule.

10 Claims, 9 Drawing Sheets

OTHER PUBLICATIONS

I. N. Robinson and A. G. Corry, "VLSI Architectures for Low-Level Image Processing"; General Electric Co., Hirst Research Center.

"Model TDC1023J—Advance Information Specification Sheet"; TRW LSI Products 1979.

"Processor-per-pixel Design Speeds Image Processing for Real-Time Applications"; Electronic Design, Mar. 1983.

Paul Kinnucan, "Machines that See"; High Technology, Apr. 1983.

M. L. Baird, "Sight-1: A Computer Vision System for Automated IC Chip Manufacture"; IEEE Transactions on Systems, Man, and Cybernetics, vol. SMC-8, No. 2, Feb. 1978.

Michael F. Deering, "Real-Time Natural Scene Analysis For a Blind Prosthesis"; Fairchild Technical Report No. 622, Aug. 1982.

D. H. Ballard and C. M. Brown, "Computer Vision"; Prentice-Hall, Inc. Chapter 2 and 3, Section 3.1 thru 3.3, 1982.

P. R. Cohen and E. A. Feigenbaum, "The Handbook of Artificial Intelligence"; HeurisTech Press, William Kaufmann, Inc., vol. 3 Chapter XIII, Sections C3 thru C6, D1, E1 thru E4, and F1 thru F3.

D. Sherdell, "A Low Level Architecture for a Real Time Computer Vision System," Proceedings of the 5th International Conference on Pattern Recognition, vol. 1 of 2, pp. 290-295, Dec. 1-4, 1980, IEEE, New York.

G. C. Nicolae et al., "The Ultrafast Asynchronous Bus—A Basic Component for Efficient Image Processing," Proceedings of the 6th International Conference on Pattern Recognition, vol. 1, pp. 250-253, Oct. 19-22, 1982, IEEE, New York.

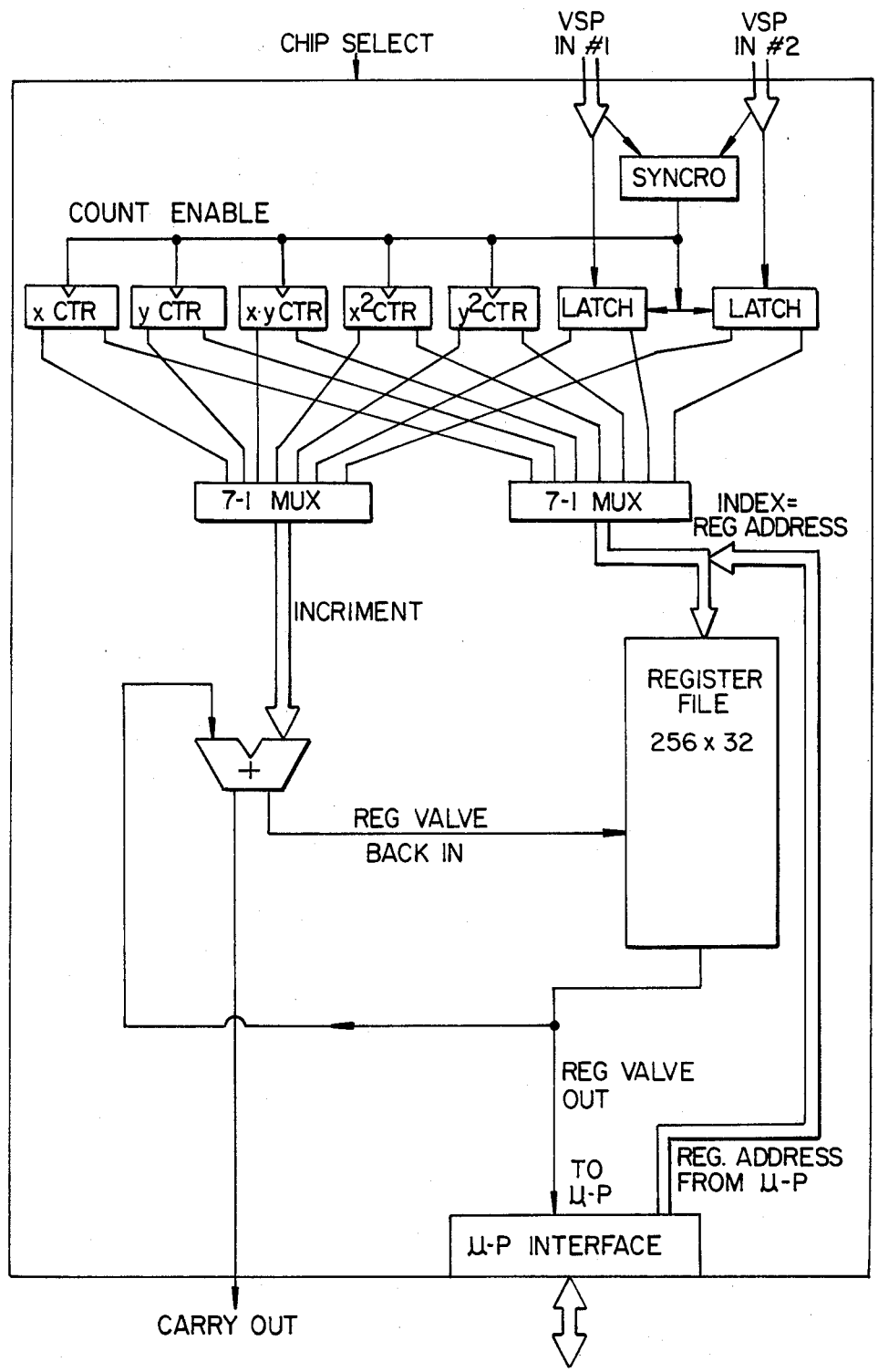
FIG._9.

VIDEO STREAM PROCESSING SYSTEM

This is a continuation of application Ser. No. 902,048, filed Aug. 26, 1986, now abandoned, which is a continuation of Ser. No. 591,217, filed Mar. 19, 1984.

BACKGROUND

This invention relates generally to the field of video signal processing and pattern recognition, and more particularly to a system of video stream processing including a modular family of novel video processing subsystem modules using digital techniques to process images.

Image recognition techniques are becoming widely utilized to automate industrial and manufacturing processing applications. Among these are such applications as locating parts on a conveyor belt, verifying the presence of parts during assembly, locating landmarks or targets in aerial imagery, optical character recognition, and locating bonding pads on alignment masks on semiconductor chips. Further, the development and implementation of systems for the more complex real time image processing and pattern recognition tasks call for computational throughputs in excess of those possible utilizing prior art techniques. In addition, in many applications digital techniques are widely employed to process the images. However, due to the massive amount of data to be analyzed and processed in such digital systems, they are often slow and incapable of operating at standard video rates. One technique often utilized to alleviate this problem is the use of parallel processing. However, a number of constraints limit the use of this approach including with the advent of VLSI techniques, the chip pin-out constraints.

SUMMARY OF THE INVENTION

The present invention is an improved video processing system which utilizes a series of submodules for performing different discrete tasks on a stream of video data, each submodule having a standard video interface and a standard processor interface. A pipeline pixel bus couples a number of submodules in series to enable video rate processing with each submodule performing a discrete task under control of a central processor.

A number of systems can be coupled in parallel to break up a video image or frame into smaller parts, but all the submodules of a particular system will operate on the same region of pixel data. The video interface is preferably asynchronous with respect to the processor interface, thus further improving the speed of operation. Each submodule is carefully constructed to perform a uniquely selected, separable function. These submodules include a frame buffer for storing a frame or a window of data in initial or intermediate form, line delay submodules for forming a stream of pixel data into a window, a histogram or statistics gathering submodule for providing statistics to the microprocessor about the pixel data and a correlator for correlating said pixel data to an image mask.

BRIEF DESCRIPTION OF THE DRAWINGS

The features of the present invention which are believed to be novel are set forth below with particularity in the appended claims. The invention, together with further objects and advantages thereof, may be understood by reference to the following description taken in conjunction with the accompanying drawings.

FIG. 9 is a detailed block diagram of a specific embodiment of a video stream processing statistics circuit.

DETAILED DESCRIPTION OF THE PREFERRED EMBODIMENT

Figure 1A:
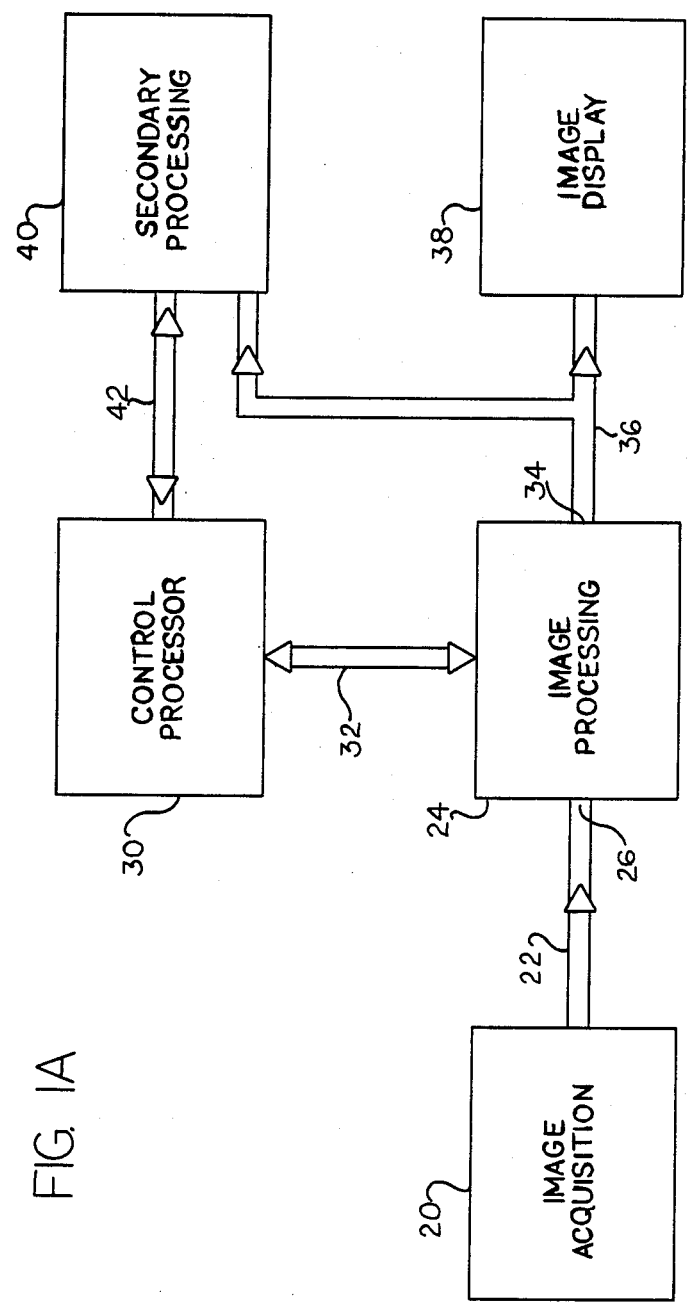
FIG. 1A is a generalized block diagram illustrating a specific embodiment of a video stream processing system for image processing.

FIG. 1A is a generalized block diagram illustrating a video stream processing system for image recognition and analysis according to the invention. Video stream processing (VSP TM) is an image processing technique in which a stream of pixels is pipelined through a variety of computational submodules which may take statistics or replace pixels with new computed values. In a pure video stream processing system there is only one linear stream of pixels per pipe upon which all devices operate directly. There may be several parallel pipes. However, images are inherently two dimensional and therefore some image processing submodules use an N-by-N window of local pixels, per pipe, to operate upon. Thus, the novel system of the invention includes streaming by an N-by-N moving window of pixels when appropriate.

Video image signals comprising a stream of pixel data to be processed are provided by an image acquisition device 20 and coupled, as shown, on a video stream signal bus 22 to an image processing system 24. The image acquisition device 20 typically is a video camera, such as a Fairchild CCD camera, capable of precise generation of video image signals at video rates. Optionally, the video acquisition device 20 may be any image signal source, such as a video tape deck, video dic, graphics computer, etc.

The image signals are digitized by the acquisition device 20 and coupled via the video stream signal bus 22 to the image processing system 24 through a video stream processing (VSP) interface 26. The image processing system 24 processes the digital image information to modify the data or extract characteristic information to provide image recognition. The processing system 24 is comprised of a family of video stream processing submodules (to be described in greater detail hereinafter) configured to provide the desired image recognition or analysis functions.

The image processing system 24 is controlled by a control processor 30 which is coupled, as shown, to a control processor interface 28 via a processor bus 32. The control processor 30 provides control signals to control each of the video stream processing submodules and provides processing capability for further processing and logic functions on data transferred between video stream processing submodules and the control processor 30 via the processor bus 32. The control processor 30 is also coupled to a secondary processing module 40 via a bus 42, as shown. The secondary processor 40 provides overall system control logic to make use of the image processing information provided by the video stream processing system 24. Typically, the secondary processor 40 is a programmed computer which controls external devices based on image processing information as, for example, in a robotics or automated manufacturing system.

In the illustrated embodiment of FIG. 1A, an image display 38 is also provided to permit display of the images being processed or of processed image data. The image display 38 is typically a CRT for real time video display but optionally may include such devices as a printer (e.g. laser printer), an image recording device such as a video tape recorder, a plotter (e.g. electrostatic) or other image display device. The video image signals from the image processing module 24 are coupled to the image display 38 via a video stream signal bus 36 from a video output interface 34, as shown.

Figure 1B:
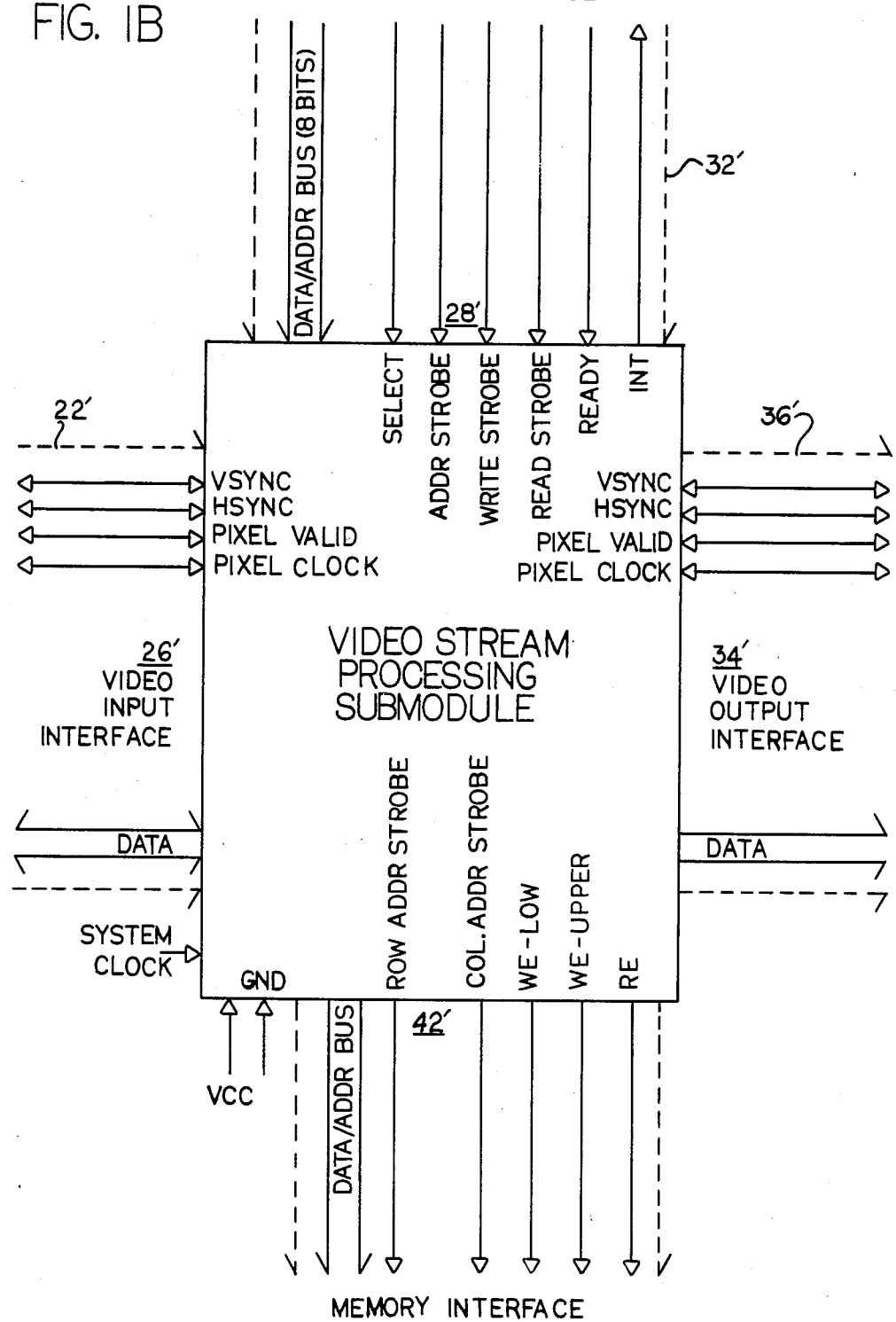
FIG. 1B is a generalized block diagram illustrating the interface and signal protocol for the illustrated novel video stream processing system.

Each VSP submodule of the video stream image processing system 24 includes a VSP input interface 26' and, in most cases, a VSP control processor interface 28' as shown in FIG. 1B. Referring to FIG. 1B, the VSP input interface 26' is used to transfer video information, digitized into pixels, in raster scan format, together with a pixel clock signal, a horizontal synchronization signal (line synchronization), a vertical synchronization signal (frame synchronization), and a pixel valid signal. In the illustrated embodiment, there are 8 bits per pixel. Greater or lesser numbers of bits per pixel can be used depending on the embodiment. Thus, as shown in FIG. 1B, the VSP input interface couples to a 12 line video stream processing signal bus 22' which is a novel bus configuration employed as the standard VSP signal bus for the illustrated video stream processing system to couple video stream signals between system submodules. In the illustrated embodiment, the VSP signal is comprised of eight data lines and three control lines. In general, the number of data lines can be from zero to sixty-four.

The video clock signal (CLOCK) for the VSP input interface 26 is, for asynchronous operation, an asynchronous clock signal with a frequency which is a fraction of the system clock frequency. All of the remaining video input interface signals are internally synchronized to the video clock signal. For the VSP input interface all of the other signals should be valid before the set-up time before the positive edge of the clock and should remain valid until at least the hold-time after the same positive edge of the video clock signal. The vertical synchronization (VSYNC) signal and the horizontal synchronization (HSYNC) signal provide the required synchronization signals associated with the input video pixel data. The valid input signal (VALID) indicates that data on the data bus is valid. It should also be noted that the VSP input interface 26' may in some cases be programmed to act as an output interface.

Many video stream processing submodules will also include a VSP output interface 34' such as shown in FIG. 1B., typically for transfer of processed video information to other submodules or to image display devices 38 or secondary processor 40. The VSP output interface 34' is similar to the video input interface 26' with the output clock signal (CLOCK) synchronized to the system clock for synchronous operation, or at a fraction thereof for asynchronous operation, and with the video data output bus controlled by the pixel valid signal (VALID) which is usually bidirectional and can be tri-stated on the output. There is a turn-on delay from the positive edge of the (VALID) signal and a turn-off delay from the negative edge of the (VALID) signal. The turn-on is designed to be slower than the turn-off so that the data paths may be easily multiplexed. The pixel valid signal is asserted active by the VSP output channel to indicate valid data output. If a VSP subsystem coupled to the VSP output channel needs to delay the next output from the VSP output channel, the VSP subsystem asserts the pixel valid signal inactive, overriding the output handshake from the VSP output channel. When the VSP subsystem stops asserting the pixel valid inactive, the pixel valid signal will again go active, and the output channel will resume output of data. All remaining VSP output interface signals are valid before the output-delay time after the positive edge of the output clock signal and remain valid until at least the output hold time after the next positive edge of the output clock signals.

Usually, video stream processing submodules will also include a VSP processor interface 28' as shown in FIG. 1B suitable for connection with any modern microprocessor (e.g. a National 16000). The signals on the VSP processor interface may be either synchronous or asynchronous. A submodule select signal (SELECT) serves to enable the processor interface for the submodule. Address information is entered from the data/address bus (DATA/ADDR) during an address strobe, while write data may be entered from the data/address bus if a write strobe occurs. Read data may be presented on the data/address bus during a read strobe. The data/address bus in the illustrated embodiment is preferably an eight bit bus.

If the data transfer cannot proceed then the ready signal (READY) is pulled low until transfer can proceed. A maskable interrupt (INT) may be used to interrupt the processor. Where an eight bit address or eight bit data word is not sufficient, for example, to access external memory, a multiple byte address may be supplied by successive bytes being transferred during successive address strobes.

A low on the SELECT line indicates when the submodule has been selected for activating the VSP processor interface and indicates that control signals on the interface are valid. In addition, a low address strobe line indicates that information on the processor bus 32' is valid address information. For multiple byte addresses the address strobe is asserted low for each address byte transferred. The write strobe when low indicates that information on the processor bus is valid write data and a low read strobe indicates that a submodule may present read data on the processor bus. The interface READY signal indicates that the submodule interface is not ready to proceed with the requested access when low and goes high when access may proceed. Finally, when low, the interface interrupt signal (INT) indicates that a requested status has been reached and the interrupt signal is released when the condition is acknowledged or masked. As shown in FIG. 1B, the VSP processor interface 28' couples to a 14 line video strem control processor bus 32' which is the standard VSP processor bus configuration for coupling each VSP system submodule or subsystem to a control processor for the illustrated video stream processing system.

Many submodules can also include a memory interface 42'. The nature of the memory interface 42' is dependent upon the particular features of the VSP submodule the desired application, and upon the external memory requirements. The memory interface 42 will provide control of external memory with minimal external circuitry. However, the memory interface will typically include at least a 16-bit data bus which may also be used as an address bus as shown in FIG. 1B and in addition will include at least a write enable (WE) which when asserted low will indicate when data is on the bus to be written to external RAM. Optionally, a separate memory address bus, typically a 12-bit address bus, may be used for external memory address. In addition, such signals as a row address strobe and column address strobe, a write enable lower and a write enable upper as well as a read enable (RE) signal, may be provided as shown in FIG. 1B at the memory interface 42'.

In the case of each VSP video interface 26', 34' as well as the VSP processor interface 28', the signal protocol described establishes the nature of the VSP busses 22' and 36' as well as the VSP processor bus 32'. This novel bus configuration and signal protocol (i.e. VSP protocol) is employed through-out the illustrated VSP system for coupling among system submodules and control processor.

Figure 2:
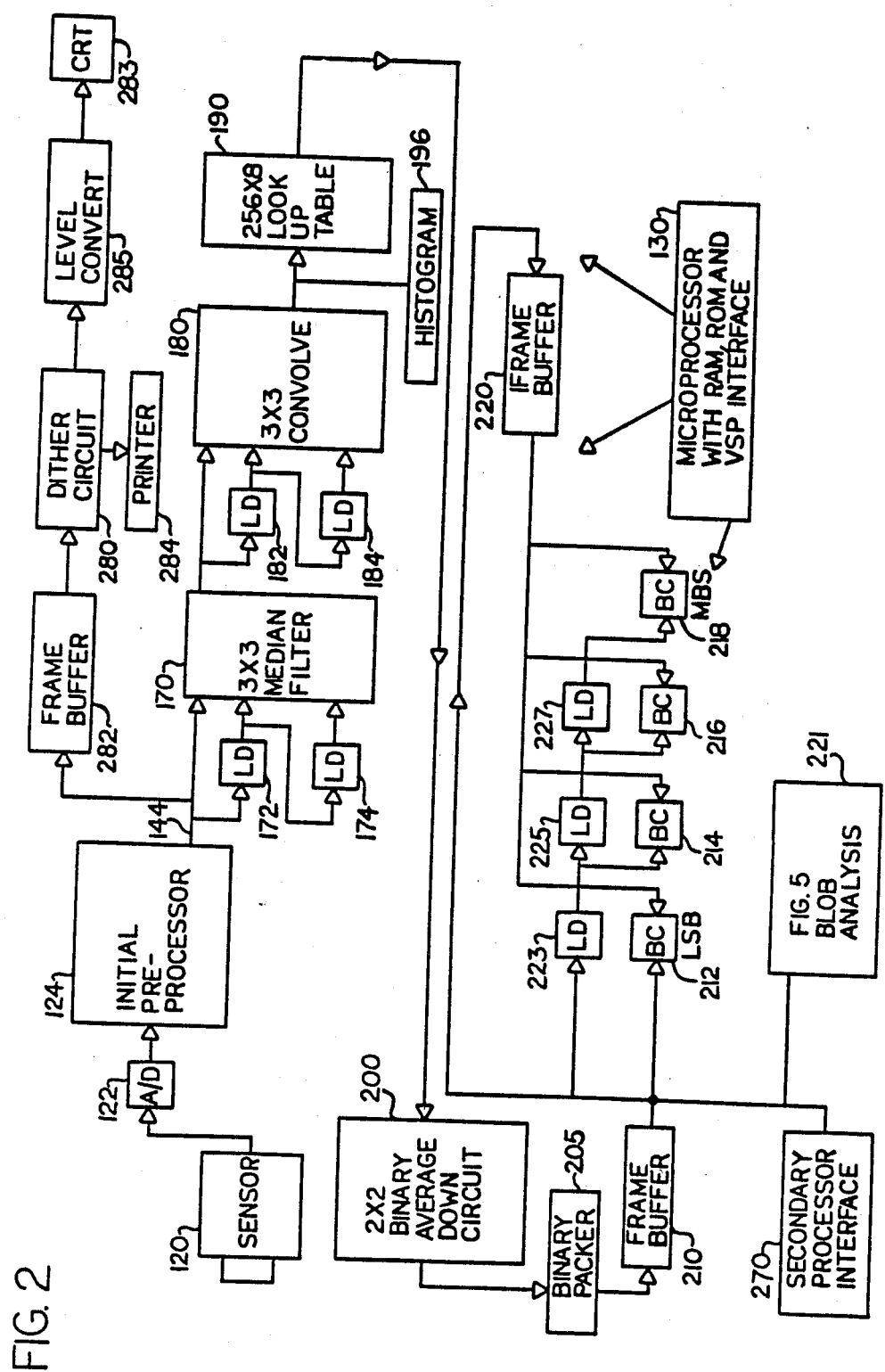
FIG. 2 is a detailed block diagram illustrating a specific embodiment of a video stream processing system for rectangle recognition.
Figure 3A:
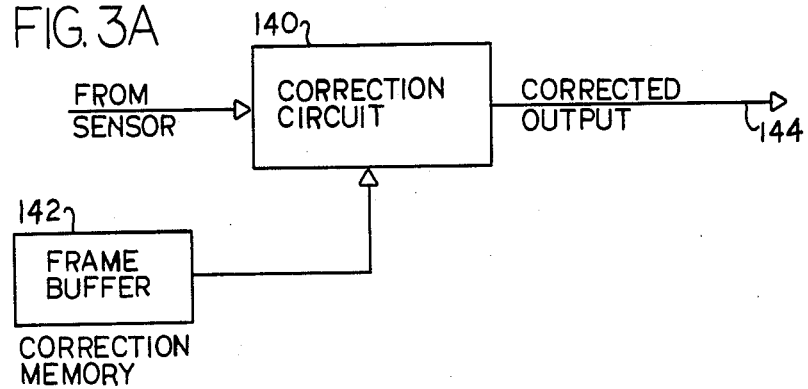
FIG. 3A is a detailed block diagram illustrating a specific embodiment of a video stream processing linear correction circuit.
Figure 3B:
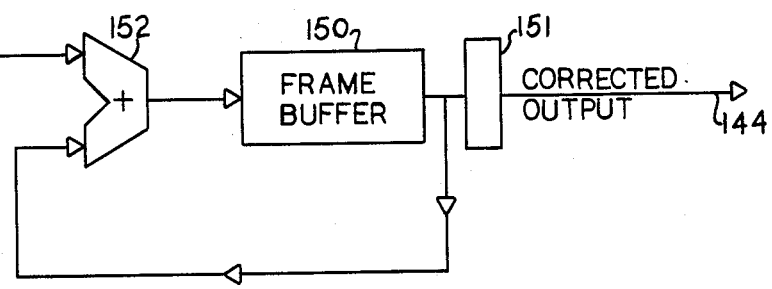
FIG. 3B is a detailed block diagram illustrating a specific embodiment of a video stream processing multi-frame averaging circuit.
Figure 4:
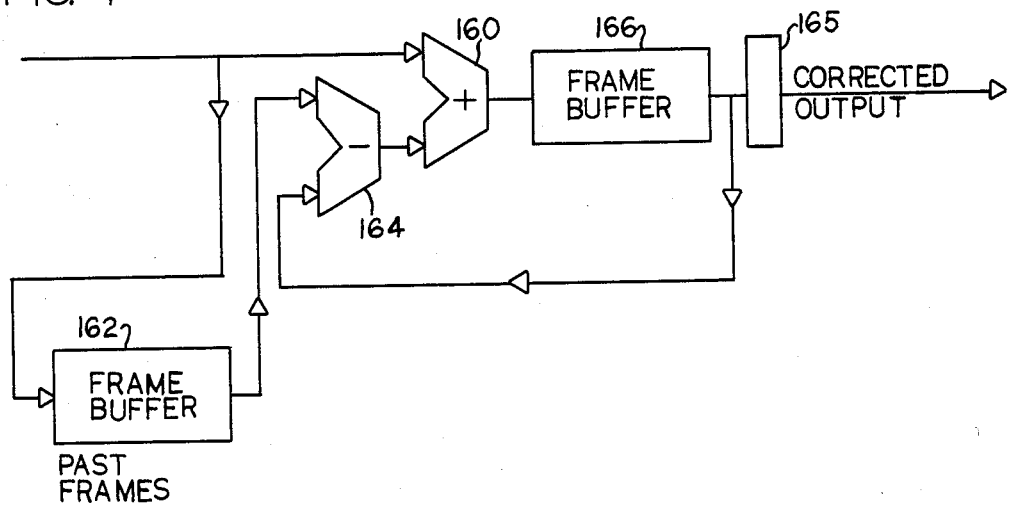
FIG. 4 is a detailed block diagram illustrating a specific embodiment of a video stream processing continuous multi-frame averaging circuit.

Referring now to FIG. 2, there is shown a block diagram of a complete VSP image processing system for locating a desired rectangle in an image. An image sensor 120 (e.g., Fairchild CCD camera) provides video signals representing the image to be processed. These signals are coupled directly to an A/D converter 122, as shown. The A/D converter 122 and the sensor 120 may be considered to be the image acquisition section of the system, and can be integrated into a single component. Alternatively, a VSP A/D sybsystem function can be provided which converts the sensor video signals into a VSP data stream. The digitized video information signals are coupled, via a VSP signal bus to the VSP interface of an initial preprocessing module 124. Initial preprocessing module 124 is composed of a number of submodules as shown in FIGS. 3A, 3B and 4. The remaining blocks of FIG. 2 are all submodules except for the image acquisition section (sensor 120 and A/D converter 122), the image display elements (printer 284 and level convert 285 and CRT 283), controlling microprocessor 130, secondary processor interface 270 and blob analysis 221 (which is composed of a number of submodules shown in FIG. 5). The interfaces of FIG. 1A possessed by each submodule are apparent from the arrows of FIG. 2. For instance, frame buffers 210, 220, 282 have both a video input and a video output, histogram 196 only has a video input and correlators 212-218 each have two video inputs and no video output. All submodules have a processor interface, not shown. Frame buffers 210, 220, 282 also have a memory interface as shown in copending application Ser. No. 892,727 filed July 29, 1986 entitled "Video Stream Processing Frame Buffer Controller" and hereby incorporated herein by reference (the "Frame Buffer Application"). Dither Circuit 280 also has its own memory interface as shown in FIG. 6. The initial preprocessing module 124, and other preprocessing to be described hereinafter, can be optional in any image processing system, but is shown as part of the preferred embodiment. It should also be noted that at least one microprocessor 130, to control VSP submodules as well as to do further processing for pattern recognition, is provided and coupled to each of the video stream processing submodules as indicated in FIG. 2. Although direct connections are omitted for simplicity, the microprocessor 130 couples to each system submodule through a processor interface 28' via a VSP control processor interface 32', when processor connection is appropriate, as described hereinbefore with reference to FIG. 1B.

Most image sensors do not produce perfect images and therefore the images require preprocessing in many VSP systems. The imperfections arise from many sources including noise, dirt, distortions in optics, etc. which may distort the image before it reaches the sensor. The sensor itself can also add further distortions as the individual pixels of a sensor area array may all have slightly different response characteristics. Most of these distortions can be corrected by appropriate types of preprocessing. But if the distortion levels are low enough, no image preprocessing may be required.

In the initial preprocessing module 124, a number of possible optional processing approaches may be taken. In some situations, conventional analog equalizing circuits may be effectively utilized, however, in more complex cases a separate gain and offset control must be applied separately to each pixel of the sensor 120. This can be done with a initial processing circuit which provides linear correction as shown in FIG. 3A. Referring to FIG. 3A, the digitized signal from the sensor 120 is applied to a correction circuit 140 which corrects each pixel by applying a correction factor stored in a correction frame buffer 142. The frame buffer 142 can be comprised of conventional dynamic RAM, or static RAM, controlled by a frame buffer controller submodule (described in detail in the Frame Buffer Application) capable of storing complete frames of image data or image related data and capable of streaming data in and out at video rates. The correction frame buffer can also be comprised of non-volatile RAM. A correction value for each pixel is stored in the frame buffer 142 which is brought into the correction circuit 140 from the frame buffer 142 in lock step with the sensor pixels so that each pixel may be custom processed with a unique correction value. The corrected pixel is coupled to an output 144, whereby the corrected pixel information is coupled to the next stage of the system as shown in FIG. 2. For any particular application, the number of frame buffers used is a matter of optimization.

Another optional type of initial processing which may be utilized separarely or in series with linear correction is multi-frame averaging. This type of preprocessing is applied if the image signal is very low resulting in a low signal to noise ratio. To correct this low signal to noise ratio, an averaging together of several frames of the images will improve the signal to noise ratio.

The circuit of FIG. 3B is one embodiment of a method of averaging each new frame from the sensor 120 to a cumulative average image. Initially, the data in a frame buffer 150 is set to zero and then each successive frame of data is added together and stored. As many frames as desired may be summed, subject to pixel word size and overflow considerations, although in the preferred embodiment between two to eight frames provides acceptable results. Thus as shown in FIG. 3B the digitized image signals are applied to an adder circuit 152 and the output of the frame buffer 150 is applied to a second input of the adder 152. The adder 152 sums the incoming pixel with the sum of the corresponding pixels stored in the frame buffer to produce a new sum which is then stored in the corresponding location in the frame buffer 150. This process is repeated until the desired number of frames has been summed together. It should be noted that this circuit will result in a reduction in the frame rate equal to the number of frames which are summed. This is quite acceptable in many systems. The sum is then averaged by an averaging circuit 151 which logically divides the sum by the number of frames summed and the corrected output is then coupled to the output 144 to be applied to the next processing stage. This logical division can be effected by actual arithmetic division, or by normalization further along the pipe.

The disadvantage of frame rate reduction that results from the preprocessing as shown in FIG. 3B may be avoided by use of a multi-frame averaging system as shown in FIG. 4. In this system, the original sensor values which are summed in the averaging frame buffer are stored away in an additional frame buffer and after a delay of several frames are subtracted back out of the summed image. In this manner a new average frame result is produced for each frame at the original video rate containing the average of the last several frames.

Thus in FIG. 4 digitized video data is applied to the input of an adder 160 and simultaneously applied to the input of a frame buffer 162, as shown. The frame buffer stores each frame of video information as it arrives and applies, after a delay of a desired number of frames, the delayed video information to the subtract input of a subractor 164. The output of the adder 160 is applied to the input of the sum frame buffer 166 for storage, and the output of the sum frame buffer 166 is coupled back to a second input of the subtractor circuit 164, as shown. The output of the subtractor circuit is subsequently applied to the input of the adder 160. As a result the input signal applied to the adder 160 is added to the sum that is fed from the output of the frame buffer 166 after a properly delayed frame buffer signal is subtracted. Thus the second signal applied to the adder 160 constitutes the existing sum in the frame buffer 166 minus the video value from the oldest frame of video information that makes up the sum from the output of frame buffer 166. The addition of new video information produces a new sum out of the output of adder 160 comprising the sum of values from the latest several frames. This sum is then stored in the frame buffer and the process is continued. The sum from the frame buffer 166 is then coupled to an averaging circuit 165 to produce a corrected output signal. The corrected output is a new average which contains the average of the latest several frames and which is generated continuously so that there is no loss in video frame rate.

An even more complex frame averaging approach may be utilized where it is desired to separately weight the images that are summed together. In this type of averaging circuit, a separate frame buffer is used to store each of a desired number of succeeding frames which are then added and averaged using a separate predetermined weight for each frame. After each frame a new frame is buffered into a frame buffer and the oldest frame of information is dropped out. Another optional circuit configuration that can be utilized is a modification of the circuit of FIG. 3B to produce exponentially weighted image sums. In this configuration a divide by two circuit is added so that only half of the old sum from the frame buffer is added to each new frame by the adder 152. As a result an image sum with an exponentially smaller contribution from previous frames is obtained.

In most applications where averaging to increase signal to noise ratio is desired the simple structure of FIG. 3B is most often suitable whenever a reduction in the frame rate is permissible. Where a higher frame rate is desired the configuration of 4 is typically the most effective approach.

Referring again to FIG. 2, the initial preprocessing produces an improved video image stream which is coupled from the output 144 of the initial preprocessing stage 124 to the input of a median filter 170. The median filter 170 provides another stage of preprocessing for correcting for another type of distortion in the video image signal which may be caused by small objects or details within the scene which obscure the main data. This type of distortion is generally characterized as high frequency noise which affects single pixels in isolation. For example, small highlights may cause a single pixel to go "off scale" while all the pixels around are reading reading quite normal values.

A method of filtering this type of noise problem is to provide median filtering. In the embodiment shown in FIG. 2 a 3×3 median filter is utilized to perform two dimensional filtering in which the original pixel and its eight nearest neighbors are sorted by their values and the pixel value that is in the middle of the sorted list is chosen as the value to replace the original pixel. A single unusual value pixel is less likely to distort the output of the median filter than with the use of an averaging filter. Thus, median filtering is a powerful filtering technique since it has less tendency to blur edges in the image. In an alternative embodiment, a 5×5 median filter can be utilized, or in general an N×N median filter cam be used.

The median filter normally outputs a single 8 bit byte corresponding to the 5th largest value of the 9 possible values. However, since other types of statistics, such as neighborhood minimum, neighborhood maximum, or any of the other values depending upon a desired bias, can be important to a specific application, the median filter is programmable through a processor interface to output any one of the 9 possible values.

Figure 8:
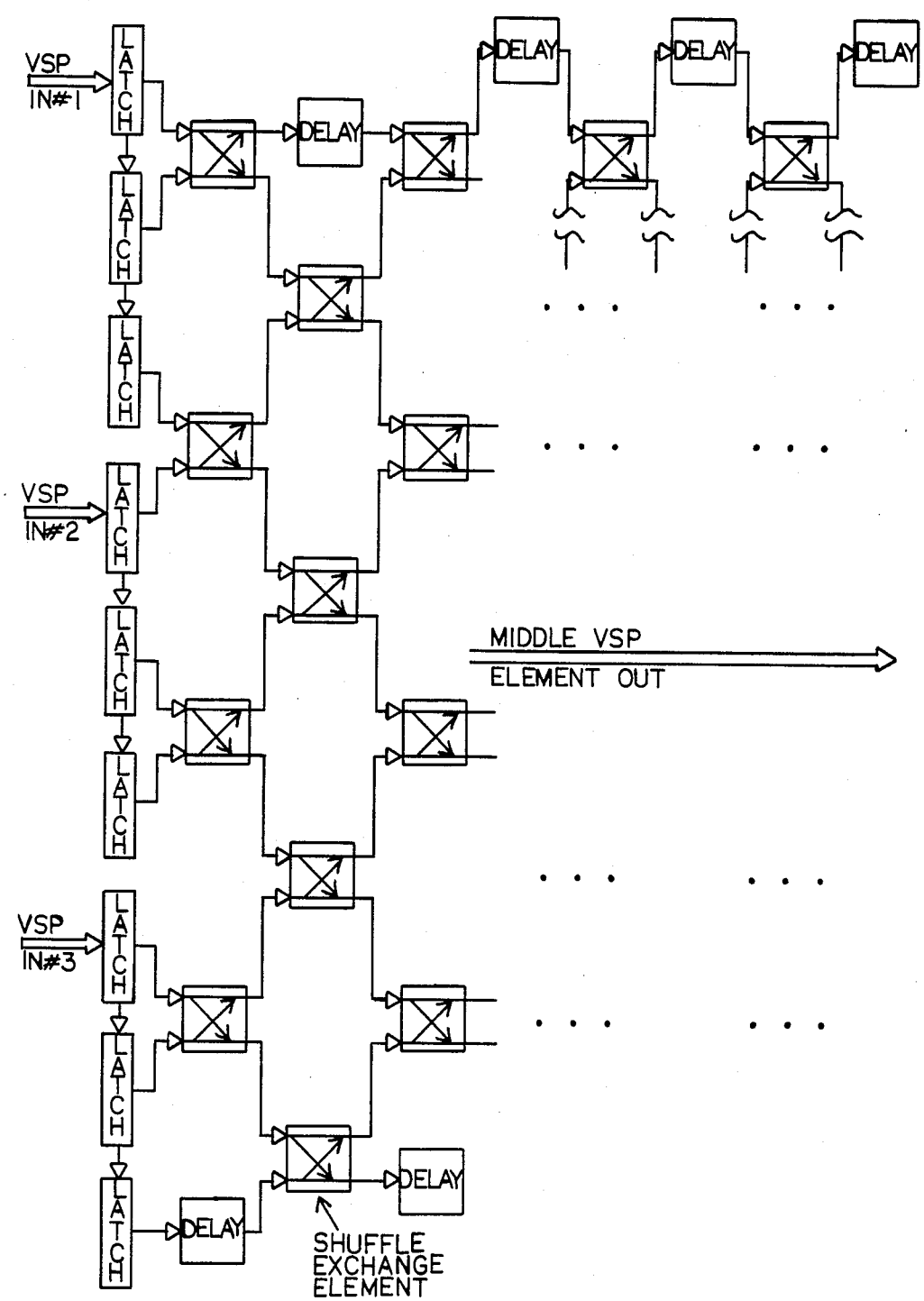
FIG. 8 is a detailed block diagram of a specific embodiment of a video processing system 3×3 convolver circuit.

A suitable median filter circuit is shown in FIG. 8 using a pipeline architecture so as to provide maximum speed of operation. The process of finding the median of 9 possible numeric values is conceptually very straight forward. The values are simply arranged in cardinal order, and the mid-value is the median. For example if the values 1–9 were entered in some order, say 7 2 8 3 1 6 5 4 9, they would be reordered to 9 8 7 6 5 4 3 2 1, and the value 5 would be the median.

When applied to a 3×3 neighborhood the values arrive in the form of an array, such as:

7 2 8
3 1 6

| | |
|---|---|
| -continued | |
| 5 4 9 | |

In a picture environment such an array would be interpreted as 3 consecutive pixels on 3 consecutive lines. The resultant median, in this case 5, is the outputted new value at the location of the center value.

For the median filter 170 shown in FIG. 2, two line-delay circuits 172, 174 are employed in parallel to set up the 3×3 window. The object of the delay lines 172, 174 is to provide a fixed delay of digital signals, measured in clock pulses, from the input to the output of the delay line. The length of the delay required varies from application to application, and in some applications the length of the delay requirement varies from state to state. For example, the VSP system often requires multiple lines of an image in parallel, but can access these lines only sequentially. Delay lines are used to provide the local line by line storage. The line length is fixed if the source is directly from a camera. If however, the source is from a frame buffer, the line length may vary depending upon how much of the image is selected to be processed. This, and applications like it, demand programmable length delay lines. Thus, the delay line is programmable through a VSP control processor interface.

Additionally, for speed and compatibility reasons a byte wide data format is employed. In the illustrated embodiment, the delay lines 172 and 174 are functionally N×10 programmable shift registers which operate on 8 bit wide data bytes. In the preferred embodiment, the length N is variable from 3 to 512 unit increments and operates at clock rates to 20 Mhz. In a specific circuit structure (not shown), data is entered byte by byte into an input register at the positive edge of the clock. This results in a fixed single unit of delay. As with most of the VSP family, operation on more than eight bits of data can be accomplished by stacking subsystems. Thus, multiples of eight bit data can be delayed by vertically stacking the delay line subsystems. Delays in excess of N can be accomplished by stacking the delay line subsystems horizontally.

In the above discussed embodiment, the storage of the data within the device occurs in dual ported 512×10 static RAMs. This can also be accomplished using two arrays of single ported RAM. For a given address, a byte is being written into one of the RAMs while the data of the previous frame is being read out of the other. This ping-pong arrangement provides maximum speed in that only one operation is being done per RAM per clock cycle. This operation results in a second fixed unit of delay.

The output of the appropriate RAM is then multiplexed and loaded into an output register. This operation results in a third fixed single unit of delay. These 3 units of delay define the minimum delay length of 3.

Programmability is determined by the number of sequential addresses generated in a 9-bit counter. During the "load address" time, a 9-bit word is serially loaded into the programmable counter at the clock rate. Alternatively, two eight bit registers can be utilized. At the end of the load cycle, the address counter is set to address 0. Then, during the delay line mode the address counter continually recycles from 0 to the pre-loaded count.

In the configuration shown in FIG. 2 each line delay circuit 172, 174 provides delay equal to one horizontal line of pixels thereby setting up three parallel horizontal lines of pixels into the three inputs shown to the median filter 170. The three horizontal lines of pixels are clocked in parallel into registers in the median filter which then process a 3×3 window which moves one pixel at a time to process each window moving at single pixel increments. The result of the median filter operation is a single pixel stream output which is then coupled to a 3×3 convolve filter 180, as shown.

Figure 7:
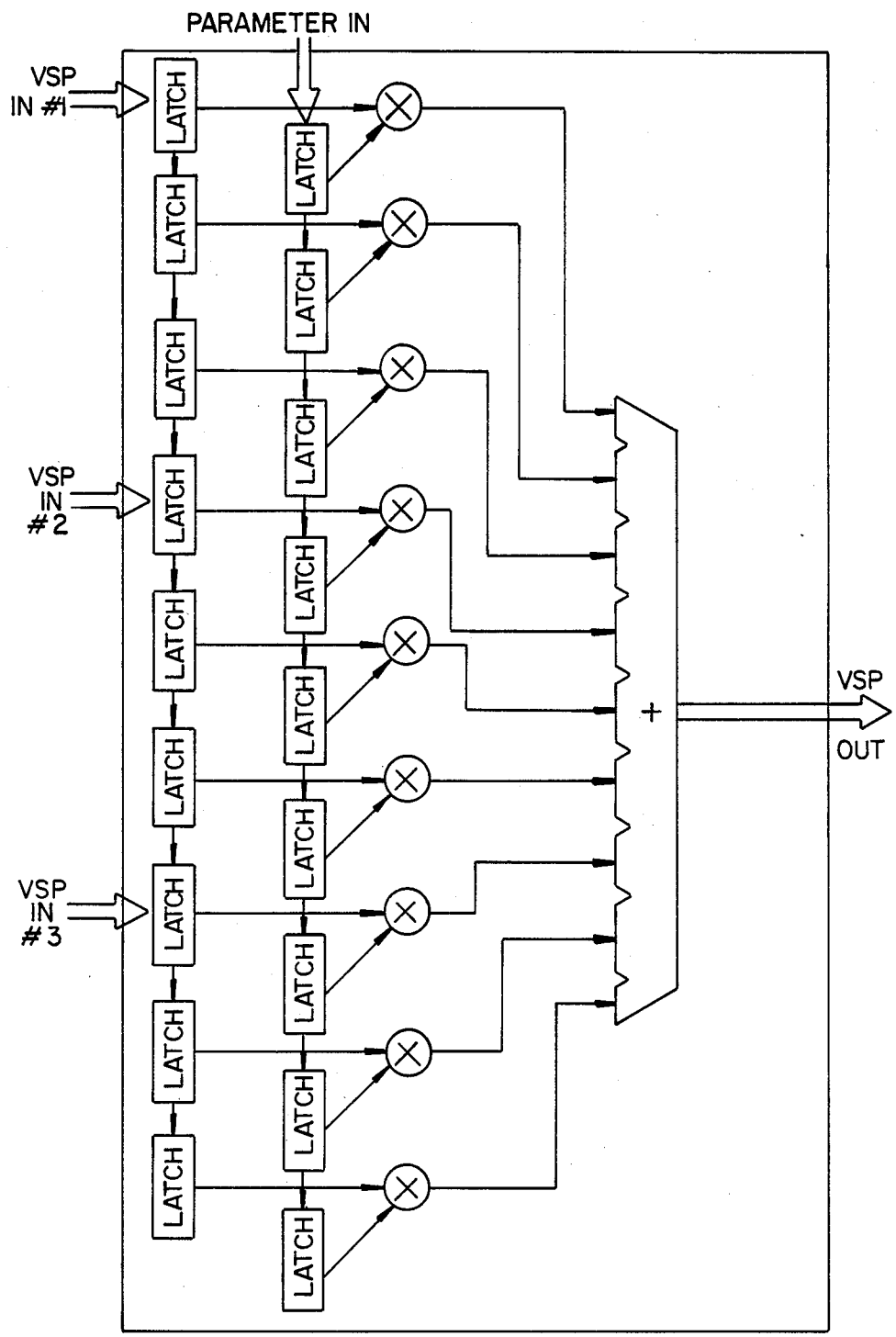
FIG. 7 is a detailed block diagram of a specific embodiment of a video stream processing 3×3 median filter.

As with the median filter, two line delays 182, 184 having a delay of a single horizontal line of pixels each are utilized to create three parallel inputs of three adjacent horizontal lines into a 3×3 convolve filter. A suitable convolve filter circuit is shown in FIG. 7. The convolve filter comprises a set of registers which create a 3×3 moving window by taking three adjacent pixels in each of the three parallel horizontal lines. The 3×3 image is then convolved with a stored 3×3 mask image, smoothing out the image values. In this operation, each pixel in the original image can be replaced by the weighted sum of the pixel and its eight closest neighbors. If all the weights are equal then the image is simply averaged down or the original pixel can be given the highest weight with the north, south, east and west neighbors given the next highest weight and the diagonal neighbors given the lowest weight. In the illustrated embodiment, an edge operator is employed to provide a clean edged image. The resulting edge enhanced video stream is coupled from the output of the convolver 180 to a look-up table 190, as shown.

The primary use of the look-up table subsystem is to provide a one-to-one mapping function. The look-up table can be used to perform inversion, squaring, square roots, clipping, and other space mappings and conversions. One use of the look-up table 190 is to provide the function of converting the image information to binary by using the pixel value as an address to the look-up table 190 and outputting a binary one or zero from that location in the memory to provide a binarization function with unpacked binary as the output of the look-up table 190. This results in a binary, edge enhanced image with well defined edges. The binary image data can now be used to detect desired images.

Subsequent processing which occurs after the described preprocessing can now determine the location or presence of such images as a desired rectangle. The output of the 3×3 convolve 180 is coupled as shown to a statistical subsystemn 196 programmed to provide histogram information on the image. These statistics are fed to the microprocessor through the VSP control processor interface previously described, and used by the processor to perform control functions such as to control the filters 170 or 180 or look-up table 190 or to control the processing in the actual image processing stages.

The output of the look-up table 190 is also coupled directly to a 2×2 binary average down circuit 200 which reduces the amount of data to be processed by a factor of 4 by averaging 2×2 windows to individual pixels in a conventional manner. The output binary data stream from the 2×2 average down circuit 200 is applied, as shown, through a binary packer 205 and therefrom directly to a frame buffer 210 where the image is buffered for further processing. Alternatively, the look-up table 190 and 2×2 Binary Average Circuit 200 can be replaced with a Gray Scale Average Circuit followed by a look-up table, which in many circumstances provides a more accurate output at a cost of added complexity.

The image data stream is read out of the frame buffer 210 and applied to the input of a series of VSP correlators 212 through 218 and to the input of a frame buffer 220 as shown. The output of the frame buffer 210 is also coupled to a series of line delay circuits 223, 225, 227 which provide a image data stream to each subsequent VSP correlator which is delayed by one complete horizontal pixel line. This parallel structure is utilized in order to provide high speed pattern recognition capability.

In operation the image from buffer 210 sends out an image which is coupled to the line-delay circuits 223, 225, 227, as shown. The line-delay circuits each delay by one horizontal line, so that after three lines have been read out of the frame buffer 210, the first line begins to be coupled to the VSP correlator 218, while the fourth line is coupled directly to the VSP correlator 212. In this way, the correlation is performed in parallel on the image four times, with each image offset vertically by one horizontal line. Once all the VSP correlators have image data coupled to them, the mask pattern data is coupled simultaneously to each so that the correlation proceeds in parallel. Any number of correlators may be used in this manner. Binary correlation is well known in the art.

In the illustrated embodiment binary masks are placed in the pattern frame buffer 220, the processor then determines the first possible position of the mask within the candidate image, and then generates successive pattern and image data addresses. The data are compared and tallied with 8 sequential horizontal mask locations being tallied in parallel. Each VSP correlator will run completely through the mask once. Then the VSP correlator can report all 8 tally results for the current mask position to the microprocessor, or compare the 8 results to the two best matches previously found by the correlator, updating the two best match values as necessary. The processor will keep the best of these, and increment the mask location to the next possible set of 8 mask positions. This process continues until all possible mask positions have been checked, at which point the microprocessor will have the best match location and value. In the illustrated embodiment multiple correlators are used in parallel so that multiple locations within the image can be matched at once.

Even though the VSP correlator is configured to process binary data, grey scale correlation as well as other operations can be performed by representing the mask and image as multiple binary image planes in which each has a different (power of two) weight. The VSP correlator subsystem can be provided with the additional ability to do generaly binary ALU operations, on the incoming data before tally, plus shift and negate functions on the partial tally results.

As an exemplary application of the system of FIG. 2, the VSP correlator system made up of VSP correlators 212 through 218 is preprogrammed with prestored images of rectangular corners with a minimum size which in the preferred embodiment is at least eleven pixels on a side for every possible angle of orientation. This technique has the advantage of being size independent for detecting a rectangle. Once the corners have been detected, the microprocessor sorts through them to find four that match up to form the rectangle desired. For each possible angle the microprocessor finds all possible reasonably large corners in the image at that angle placing them in buckets sorted by angle and then sorts through to remove duplicates. In order for a particular corner to be part of a rectangle, the two corners neighboring this corner must somewhere appear upon two lines defined by the 90 degree sides of the corner. Thus, for each corner, the system searchs along these lines for corners at compatible angles. If none are found, the corner is discarded, and if two correct corners are found, a rectangle has probably been located and the system searches for the fourth corner. After all corners have been run through the process, a list of possible rectangles is created. These potential rectangles are processed to determine if they have the proper width to height ratio for the desired rectangle, and may be further processed to determine if the object looks like a rectangle by following the edges as determined by the corners. Other tests may also be performed by the processor, if necessary, to identify the desired rectangle. It may also be necessary to allow even fairly marginal corner candidates to be brought under consideration. A strength weight is attached to each corner, and for each potential rectangle found, the ones with corners having too low of a total weight are thrown out. By appropriate programming, the system of FIG. 2 can perform numerous other video processing tasks.

In addition to the VSP correlator circuitry the output of the frame buffer 210 is also coupled directly to a blob analysis circuit 221 as shown in FIG. 2. The blob analysis circuit is shown in greater detail in FIG. 5, where the output from frame buffer 210 is coupled to the input of a frame buffer 222 to buffer the image signals for further processing. The binary image stream from the frame buffer 222 is coupled directly to a connectivity circuit 224 which performs connectivity analysis by analyzing the circuit for connected regions and labeling each connected region in the image with a unique label.

Blob or connectively analysis is a necessary prerequisite to the understanding and subsequent decision making on images which involves correctly labeling the different regions within the image. For example, an all dark image containing a single light hole is an image containing two regions. The video stream processing system may be required, for example, to verify the location and area of the hole. To perform that task the system must first determine what is, and is not, a hole. The performance of this identification process is the function of the connectivity circuit 224.

An important characteristics of any region labeling is the ability to operate in real time on successive frames. While this may not be required in some inspection environments, it is important when a moving object, such as an autonomous vehicle, is visually target directed. The connectivity circuit 224 can accomodate this need by operating in a pipeline fashion at the video rate.

A second important consideration is that of being able to operate on any image. While the illustrated embodiment requires only a binary representation, the connectivity circuit can operate over a complete 8-bit grey scale range. The limited scale cases are considered as subsets of the general case by the connectivity circuit 224. These limited range cases, of course, significantly reduce the number of identifiable regions, regions that may often be erroneous due to noise, or misleading due to such factors as shadowing.

A third important consideration is the number of times an image need be processed through a region labeling circuit before all regions are correctly labeled. Certain complex and slow techniques are known which can do single pass labeling. The connectivity circuit 224 is a two-pass circuit that operates in real time and is sufficiently simple to be totally contained within a single VLSI device. During the first pass the image is scanned top to bottom, left to right. During the second pass the image is scanned bottom to top, right to left (i.e. backwards). When full video rate processing is required, two connectivity circuits can be cascaded to provide for processing in a single pass through the two circuits.

In order to do an adequate connectivity analysis it is necessary to buffer the output from the connectivity circuit 224 directly to a second frame buffer 226, as shown. The output of the frame buffer 226 is coupled back to the input of the connectivity circuit 224 to run the results through the connectivity circuit 224 backwards, in order to verify and correct the region labeling results of the first pass through the connectivity circuit 224. The results of this operation is an image in which each separately connected region has been given a unique numeric label and each pixel of each region has its unique region label. All pixels of a given region have identical labels. In order to make corrections that are detected on the second pass the corrected information is passed to the microprocessor 130 and stored in a look-up table 232. After the second pass is complete, the labelled data stream from frame buffer 226 is coupled through the look-up table 232 to a third frame buffer 234 where the corrected information is stored after being corrected by the look-up operation in the look-up table 232. Optionally, the connectivity circuit 224 may make the corrections directly to the image data and eliminate the need for the look-up table 232 and the third frame buffer 234.

Figure 5:
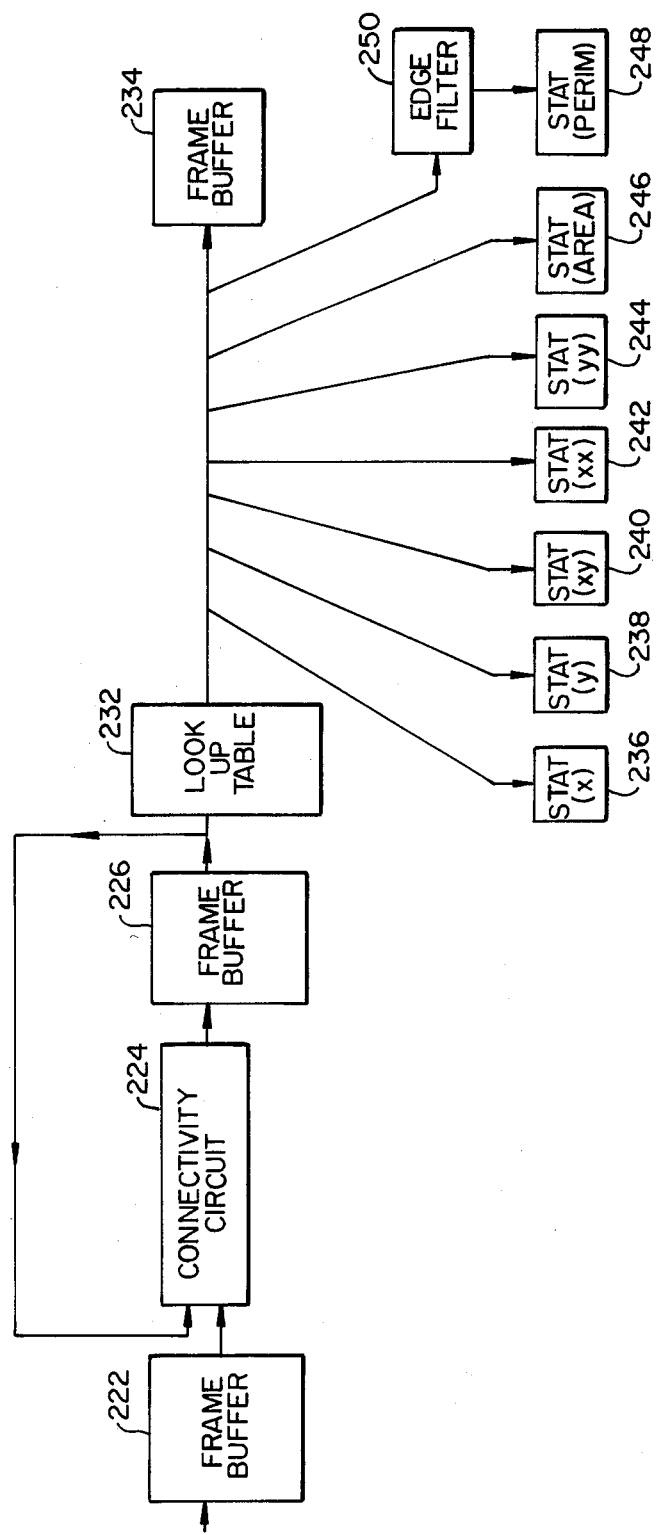
FIG. 5 is a detailed block diagram illustrating a specific embodiment of a video stream processing region labeling and analysis system (i.e. Blob analysis).
Figure 6:
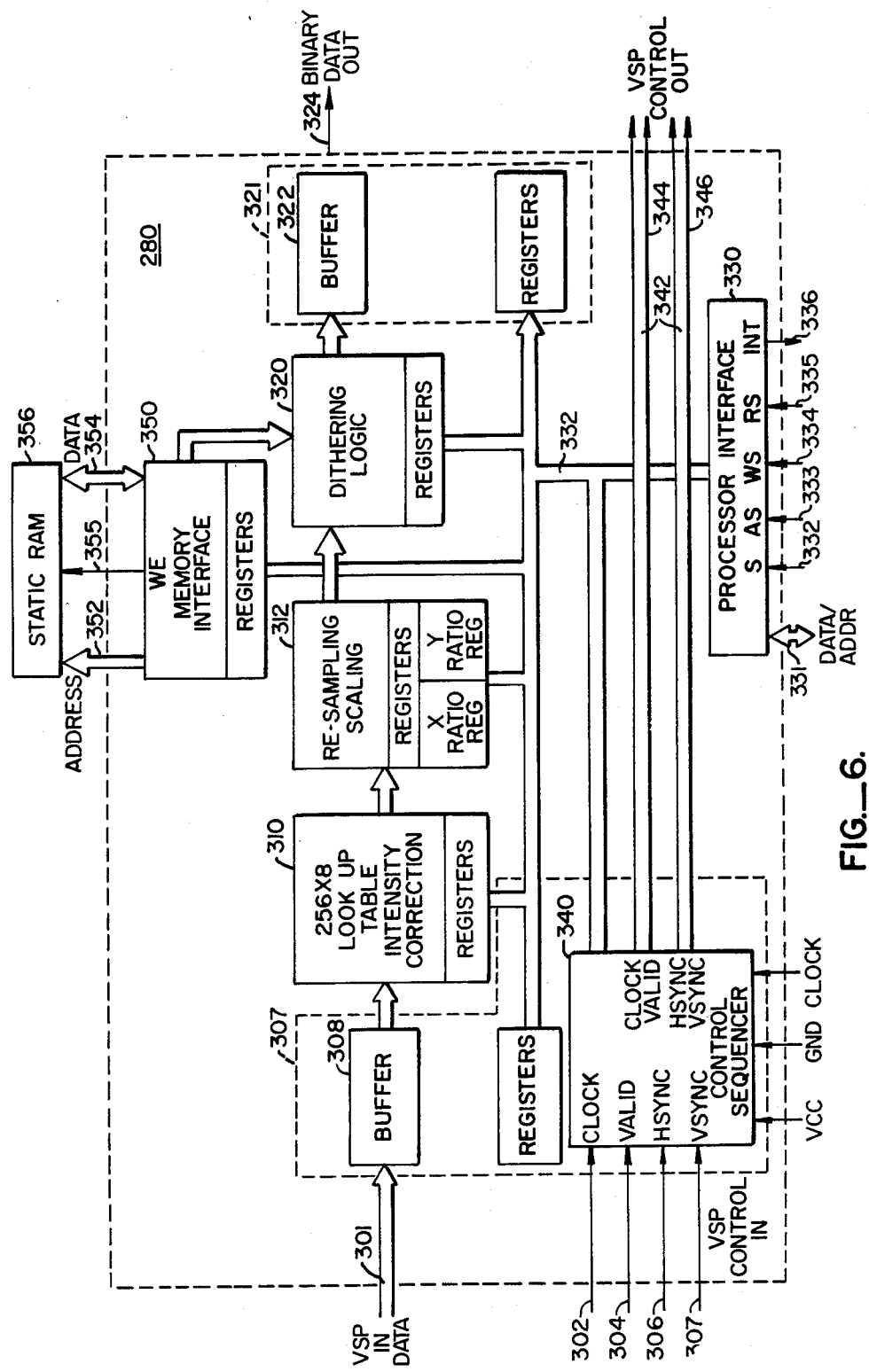
FIG. 6 is a detailed block diagram illustrating a specific embodiment of a novel video stream processing dither circuit.

Once the corrected region labels have been generated the labeled image information is then passed to a series of statistics circuits or subsystems 236 through 248 as shown in FIG. 5. The statistics circuits are programmable to perform any one of a plurality of predefined types of statistics on the region labeled video image information under the control of the microprocessor 130 and pass the statistics information to the microprocessor 130 for analysis. These statistics can be used to identify and locate regions, such as holes or defects, etc. Thus, after the rectangle has been located by the VSP system, it can be analysed for defects such as improperly located holes or the presence of contaminants.

The statistics circuits 236-248 comprise arithmetic circuits, counters and registers which sort region labeled information into register locations for each region and perform basic arithmetic operations in order to determine certain desired statistical values. The statistical circuit can be programmed to compute a value desired, and sum the value into a counter indexed by either the number of the region or an input value. Thus under the control of the microprocessor 130, the statistics circuit looks at the labelled data stream and gathers the statistics for which it is programmed. A suitable statistics circuit is shown in FIG. 9.

In the illustrated embodiment, the statistics circuit 236 is shown programmed to find the average x coordinate of a region and the statistics circuit 238 is shown programmed to find the average y coordinate of each region. To determine the x coordinate value, the statistics circuit 238 looks at each pixel and as each pixel from a particular labelled region arrives, it adds the current x-location of that pixel, as determined by a statistics circuit parameter generator, into an accumulating regis-ter for that region. The average x coordinate is then determined by the processor 130 by dividing the result by the area of the region determined by the area statistics circuit 246. The y coordinate is similarly determined by the statistics circuit 238. This provides the average x,y position of each region or, the centroid (the zeroth moment) of the object which is form of weighted center of the region.

The statistics circuit 240 provides the x times y value for each region. The statistics circuit 242 provides the x times x product for each region and the statistics circuit 244 provides the y times y product for each region. By taking an average of these statistical results, by dividing by the area of the region, the microprocessor 130 can determine the average xx, xy, and yy of each region. These values provide a means for deriving second order moments of a region and therefore indicate the orientation of the object involved. This effectively results in the fitting an ellipse to the region which provides the major axis and minor axis, and thus the orientation of the region. In addition, the relative lengths of the major and minor axis provides information about the shape of the object.

The statistics circuit 246 determines the area of each region simply by adding up the pixel values for each region in an accumulating register for the region. Thus anytime a pixel of a particular region arrives, the accumulating register for that region is incremented by one, thus providing the number of pixels in each region. This number is then used to normalize the other statistics. The statistics circuit 248 determines the perimeter of each region subsequent to an edge filter operation performed by the edge filter 250, as shown. The microprocesor can then process the area and perimeter information and, for example, determine the general shape of an object by comparing the perimeter squared to the area value. For example, an object which has a very large perimeter and a small area is one which is very long and narrow, such as a hair or thin fiber. Thus, using the axis information and perimeter to area value, such undesired contaminants as fibers can be identified in an image. Although not shown, this system can also be used to compute the number of holes in a region of an object.

Referring again to FIG. 2, this is shown, coupled to the output of the frame buffer 210, an example is shown of a secondary processor interface 270, which permits coupling of binary image data from the frame buffer 210 to a secondary control processor separate from the image processing system. The secondary processor may then use the data from frame buffer 210 as well as information coupled from microprocessor 130 for further signal processing or for control decisions in an overall system which utilizes the image processing capability for decision-making. For example, the secondary processor may be the controlling computer in an automated manufacturing system which utilizes pattern recognition.

Referring back to circuit of FIG. 2 a dither circuit 280 is coupled to the output of the 3×3 convolver 180 through a frame buffer 282. The edge enhanced output of the convolve filter 180 is coupled directly to a frame buffer 282 where the image is buffered for access by the dither circuit 280. The output of the frame buffer 282 is coupled directly to the dither circuit 280 where a dither function is performed on the gray scale image signals provided from the frame buffer 282. The dither circuit is coupled through a level converter 285 to a CRT 283 and also directly to a printer 284 as shown. The dither circuit performs a dithering function which is a form of half-toning gray scale images into a bi-level display such as a printer 284 or an inexpensive bit-mapped computer CRT 283.

The dither circuit 280 is shown in greater detail in FIG. 6A. The dither circuit 280 in FIG. 6A has a conventional VSP input interface comprising an 8-bit data input 301, a CLOCK input 302, a VALID input 304, an HSYNC 306 and VSYNC 307, as shown. The 8-bit video data is coupled directly into an input buffer 308 of the input interface 307 and then through a lookup table 310 for performing such functions as intensity correction. After intensity correction in table 310, the corrected video data is coupled through a resampling and scaling circuit 312 and from there to the dither logic 320, as shown. The dither logic 320 couples the dithered output to an output buffer 322 of the output interface 321 which comprises a binary data stream. The output of the buffer 322 couples the binary dithered data directly to the output 324 of the dither circuit.

Each of the circuits 307, 310, 312, 320 and 321 is controlled by the microprocessor 130 through a VSP control processor interface 330. The control processor interface 330 couples through a bus 332 to the above mentioned circuits and to a control sequencer 340 and a memory interface 350. Each of these circuits contain a set of control registers which are loaded from the control processor interface 330. The control processor interface 330 includes a data/address, input/output port 331, a select input (S) 332, an address strobe (AS) 333, a write strobe (WS) 334, a read strobe (RS) 333, and an interrupt (INT) 336.

In the illustrated embodiment, the maximum clock rate at which the dither circuit 280 processes data is 10 Mhz. This is the internal data clock rate, ICLK. Higher clock rates are possible if needed. The other circuit 280 may operate in a VSP system where the system clock is 30 Mhz. The data rate flags must be set to give the normal data rate of one third of the system clock. If the input CLOCK or the output CLOCK are programmed as outputs then the data clock rate is 10 Mhz, that is, one third of the system clock. If the input CLOCK or the output CLOCK are programmed as inputs then the following rules apply.

1. A clock signal may be input which is synchronous with the system clock, but at the internal data clock rate of 10 Mhz.

2. Any continuous, asynchronous clock signal may be input which is a fraction of the internal data clock rate.

The dither circuit 280 may operate in a non-VSP system, or where the system clock is less than 30 Mhz. the data rate options allow an internal data clock rate of one times, two thirds, one half, and one third of the system clock rate. Other fractional data rates are possible, if needed. These options may only be used in applications where the system clock is less than 30 Mhz and the resulting internal data clock rate is less than or equal to 10 Mhz.

The data input 301 of the VSP input interface is an 8-bit video input data bus, wherein data may be input when the VALID input 304 is high. When the VALID input 304 is pulled low by the dither circuit, no further pixels can be transferred and the data bus enters a tristate condition. The VSYNC input 306 may be used to indicate the start of a frame on a high/low transition or may indicate a frame request output. The HSYNC input 307 indicates a line request output when high and if it remains high after an entire line has been transferred then the same line is repeated. The clock input 302 indicates on a positive edge that, new data is present.

The input VSYNC signal controls the frame timing. If if is programmed as a "Frame Valid" input then the positive edge indicates sart of a frame. If it is programmed as a "Frame Request" output then it is asserted when the Dither circuit is ready to input the next frame, and it remains asserted until the frame, or desired part of a frame, has been transferred. The negative edge indicates the end of the desired frame, or part of a frame where the rest of te frame is not required.

The input HSYNC signal controls the line timing. When asserted it indicates "Line Request" and the positive edge indicates request fo a new line, and it remains asserted until the line, or desired part of a line, has been transferred. The negative edge indicates the end of the desired line, or part of a line where the rest of te line is not required. If HSYNC remains asserted after the entire line has been transferred then that same line is repeated.

The input VALID signal determines the validity of the data on the video input data bus. When VALID is input high, to indicate valid pixel, VALID may be pulled down to interrupt the flow of pixels. When VALID is released and it goes high, or when it next goes high, then the data in the following cycle is the valid next pixel.

The data/address bus on the microprocessor interface is an 8-bit bus, wherein address information is input, clocked by the positive edge of the address strobe, or data is written, clocked by the positive edge of the right strobe, or data is read out at the end of a read strobe. The chip select signal indicates that the dither circuit interface is activated and that the control signals are valid. The interrupt signal indicates that it requested status such as "end of frame" has been reached and is released when the condition is acknowledged or masked. The address strobe indicates that the information on the microprocessor bus is valid address information. For access to internal registers of the circuit, a single byte address is utilized. The right strobe indicates that information on the microprocessor bus is valid right data and the read strobe indicates that the dither circuit 280 may present read data on the microprocessor bus.

To load one of the registers, the specific 8-bit register address is presented on the data/address bus during the address strobe. Then the data to be loaded into the register is presented on the bus during the write strobe. Thus the dither circuit 280 may be considered as a memory mapped peripheral on the memory bus with some high order decode being used to generate the select. Or the dither circuit may be considered as a peripheral with two peripheral addresses (one address line), where the byte transferred to first address is the register address within the dither circuit and the byte transferred to or from the second (peripheral) address is the register contents. To read one of the registers, the 8-bit address is presented, as for a register load. The contents of the register are read out onto the data/address bus during the read strobe.

The dither circuit 280 allows a multiple byte data transfer. After a register is addressed, successive bytes transferred access the successive increment of the logical address of the registers. If the address portion of the microprocessor access points to the intensity correction RAM or to the external error RAM, then successive data bytes transferred access successive memory locations within the RAM.

The output interface of the dither circuit 280 has a binary output (DATA) in which the data output is a single binary data output clocked by the positive edge of the pixel clock (CLOCK) 342. The pixel clock 342 is an internally generated clock which indicates new data is present on the data output line. The vertical sync output 346 may be a frame valid output which indicates the start of a frame on a low to high transition and aborts the frame when pulled low, and may also be programmed to act as a frame request input. The horizontal sync output (HSYNC) 344 indicates the start of a horizontal line on a low to High transition and aborts the frame if pulled low, while it may also be programmed as a line request input. The valid output (VALID) 343 indicates that data on the data output line 324 is valid in the following cycle and may be programmed as an input signal. When pulled low, no further bits are transferred and the data line enters the tri-state condition. It may also be programmed as only an output signal.

The binary output interface may be connected to any binary video destination, such as a printer, or to the input of some other VSP submodule, such as a frame buffer controller (FBC).

The output pixel clock (CLOCK) may be programmed as an input signal or an output signal. If CLOCK is an output signal then the internal data clock is output. If CLOCK is an input signal, then a synchronous clock, at the internal data clock rate or any continuous, asynchronous clock, up to half of the internal data clock rate, may be input. The internal data clock rate is 10 MHz, normally one third of the system clock frequency.

All of the remaining output interface signals, (VSYNC, HSYNC, VALID and DATA), are internally synchronized to the binary output clock (CLOCK), whether this is an input or an output. Thus, all of these signals, as outputs, are valid before the output-delay time after the positive edge of CLOCK and remain valid until at least the output-hold-time after the next (or some subsequent) positive edge of the CLOCK signal.

If any of the output interface signals (VSYNC, HSYNC, VALID) are programmed as inputs then these also are internally synchronized to the input clock (302) (CLOCK), whether this is an input or an output. Thus all of these signals, as inputs, must be valid before the set-up before the positive edge of the input clock signal, and must remain valid until at least the hold-time after the same positive edge of the input clock signal.

The binary data output 324 (DATA) may be programmed to be tri-state controlled by the output VALID signal. There is a turn-on delay from the positive edge of CLOCK after VALID is asserted and a turn-off delay from the positive edge of CLOCK after VALID goes low.

The VSYNC signal controls the frame timing. If it is programmed as a "Frame Valid" ouput the low-high transition indicates start of a frame. If it is pulled low then the frame is aborted. If it is programmed as a "Frame Request" input, then the frame is output when VSYNC is asserted.

The HSYNC signal controls the line timing. If it is programmed as a "Line Valid" output then HSYNC is asserted before the start of the line and remains asserted until after the end of the line. If HSYNC is programmed as a "Line Request" input then the positive edge indicates a request for a new line, and it remains asserted until the line, or desired part of a line, has been transferred. The negative edge indicates the end of the desired line, or part of a line where the rest of the line is not required.

The input VALID signal determines the validity of the binary output data. If it is programmed as an output then data is a valid pixel in the cycle following when VALID is asserted. If VALID is programmed as bidirectional, then when VALID is output high, to indicate valid pixel, VALID may be pulled down to interrupt the flow of pixels. When VALID is released and it goes high, or when it next goes high, then the data in the following cycle is the valid next pixel. The binary output data line is in the tri-state condition in the cycle following when VALID is low.

The memory interface 350, in addition a coupling to the control processor interface 330 as well as the control sequencer 340, also couples directly to the dither logic 320, as shown. The memory interface 350 provides interface between the dither and external static RAM 356 and includes an address bus 352, a data bus 354, and a control line 355. The address bus 355 addresses the external static memory and the control line 355 is a memory write enable (WE) which indicates that data on the bus is write data to be written to the RAM 356. The memory data bus 354 provides for writing of data when the right enable is asserted and reads data when the right enable is not asserted.

The memory interface is connected directly to static memory 16 bits wide. The amount of memory required depends on the maximum line length to be processed and is half the maximum line length by 16 bits wide. The speed of the memory should be 25 ns faster than the internal data clock period.

Any static memory parts may be used, provided they meet the timing requirements and also have common data input and data output lines. Parts which have separate data input from data output lines may be used provided the data-in and data-out lines may be tied together without violating any loading or timing requirements.

The memory is used to store the 8-bit cumulative error term associated with each pixel along the line. As each line is processed the error term for each pixel is read from the memory, and the resulting new cumulative error term is written to the memory. Thus a read and a write are associated with each pixel along the line. In order to avoid transferring data in and out of the dither circuit at twice the internal data clock rate, the error terms are paired. Two 8-bit error terms are read from the memory and then two error terms are written to the memory.

It is preferable not to have to wait for the addresses to the memory to settle before applying the write enable signal. For this reason the same address used for reading the two error terms is also used for writing the two new error terms. The dither chip circuit 280 track of where the start of line error term is located in memory, which advances for each line processed. The end of the line "wraps around" to the beginning of memory and may be considered as a "loop" memory controlled by the dither circuit 280. No special property of the external static RAM 356 is required for this function. All the memory interface signals are synchronized to the system clock.

There are a number of registers in the dither circuit 280 which may be loaded or read by the control processor. In addition the dither circuit includes working registers, which cannot be accessed by the control processor, and which duplicate most of the registers accessible by the control processor. The dither circuit uses the working registers to process a given frame while the control processor may load the equivalent register in preparation for the subsequent frame. The contents of each register are transferred to the working equivalent under the control of a handshake between the control processor and the dither circuit 280.

What is claimed is:

1. A video signal processing system comprising:
   means for coupling to a video signal source of pixel data;
   a modular family of vision processing subsystems, each modular subsystem having a standard processor interface and a standard video input interface, at least one of said modular subsystems having a video output interface for coupling to a video input interface of another modular subsystem or an output of said video signal processing system, a plurality of said subsystems being different, special purpose subsystems permanently configured to perform different operations on said pixel data, including
   frame buffer means for selectively storing and retrieving said pixel data in a read/write memory and communicating said pixel data between said read/write memory and said video input interface,
   histogram means for outputting characteristic data representative of statistic analysis of said pixel data responsive to signals on said processor interface,
   look-up table means for functionally mapping from pixel data, as input through said video input interface, to characteristic data for output as pixel data through said video output interface,
   filter means for constructing an N×M window of pixel data and providing characteristic data on said N×M window, and
   delay means having M storage units and providing for selective shifting of pixel data unidirectionally relative to the M storage units of said delay means so as to effect a temporal delay of M shift times;
   a pipeline pixel bus coupling in series said means for coupling to a video signal source and a plurality of said video input interfaces and providing a valid pixel synchronization signal, a line synchronization signal, a frame synchronization signal, and pixel data; and
   a processor bus coupled to each said standard processor interface.

2. The system of claim 1 wherein a plurality of said modular subsystems each further comprises a custom memory interface.

3. The system of claim 1 further comprising a plurality of memories, each said memory being coupled to one of said plurality of said modular subsystems.

4. The system of claim 1 further comprising means for multiplexing addresses and data on said processor bus.

5. The system of claim 1 wherein said pixel data is in raster scan format.

6. The system of claim 1 wherein said pixel bus and said processor bus are asynchronous with respect to each other.

7. The system of claim 1 further comprising a plurality of processor interface select lines, each of said select lines being coupled to one of said standard processor interfaces.

8. The system of claim 1 further comprising a processor coupled to said processor bus.

9. The system of claim 1 wherein said processor interface includes a select line, a transfer delay line and multiplexed data and address lines.

10. The system as in claim wherein said delay means is further comprised of
    a plurality of N delay means, including first and last delay means,
        each delay means having M storage units, each delay means providing for selective shifting the addressing of pixel data unidirectionally relative to the M storage units of said delay means so as to effect a temporal delay of M shift times,
    the input of said first delay means coupled to receive the output pixel data from the video interface of one of said plurality of subsystems,
    the output of each said N delay means coupling to a separate one of N video interface inputs of a second one of said plurality of subsystems having N video interfaces.
    the outputs of all but the last delay means coupling to the input of a next delay means,
    wherein said plurality of N delay means provides N temporally staggered streams of M units of pixel data output to said second subsystem.

* * * * *